United States Patent [19]

Boutto et al.

[11] Patent Number: 4,589,259

[45] Date of Patent: May 20, 1986

[54] GRAVITY PULL ROTOR

[76] Inventors: Uuno J. Boutto; George Spector, both of 233 Broadway Rm 3615, New York, N.Y. 10007

[21] Appl. No.: 756,321

[22] Filed: Jul. 18, 1985

[51] Int. Cl.⁴ ............................................. F01B 21/04
[52] U.S. Cl. ............................................ 60/698; 185/7
[58] Field of Search ................. 60/698, 716, 720; 185/7, 33

[56] References Cited

U.S. PATENT DOCUMENTS

| 578,062 | 3/1897 | Lightner | 185/7 |
| 847,072 | 3/1907 | Hughes | 60/698 |
| 2,989,839 | 6/1961 | Croy | 185/7 |

Primary Examiner—Stephen F. Husar

[57] ABSTRACT

A gravity operated rotor with an auxiliary motor is provided and consists of a plurality of radially extending curved chutes with slideable weights therein affixed around the circumference of a rotor drum whereby the force of gravity will change the center of gravity within the rotor drum to rotate a drive shaft connected to it which keeps the rotor drum rotating. When friction eventually slows down the rotation of the rotor drum the auxiliary motor will assist in rotating the drive shaft.

9 Claims, 3 Drawing Figures

U.S. Patent  May 20, 1986  4,589,259
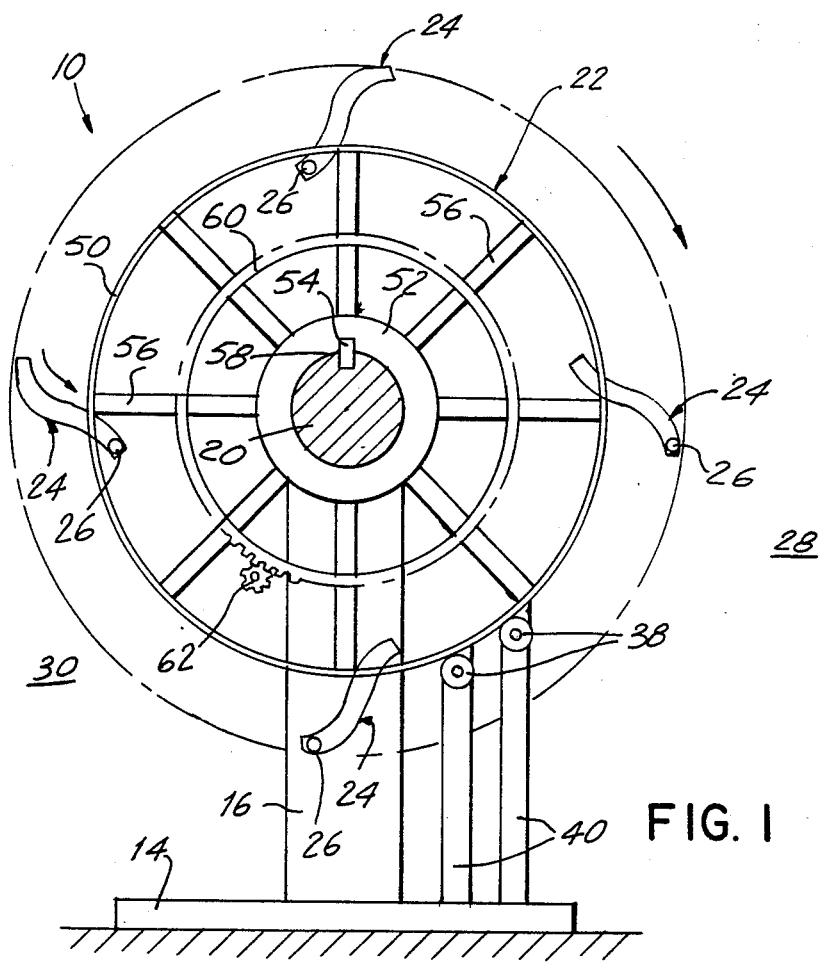
FIG. 1
FIG. 3
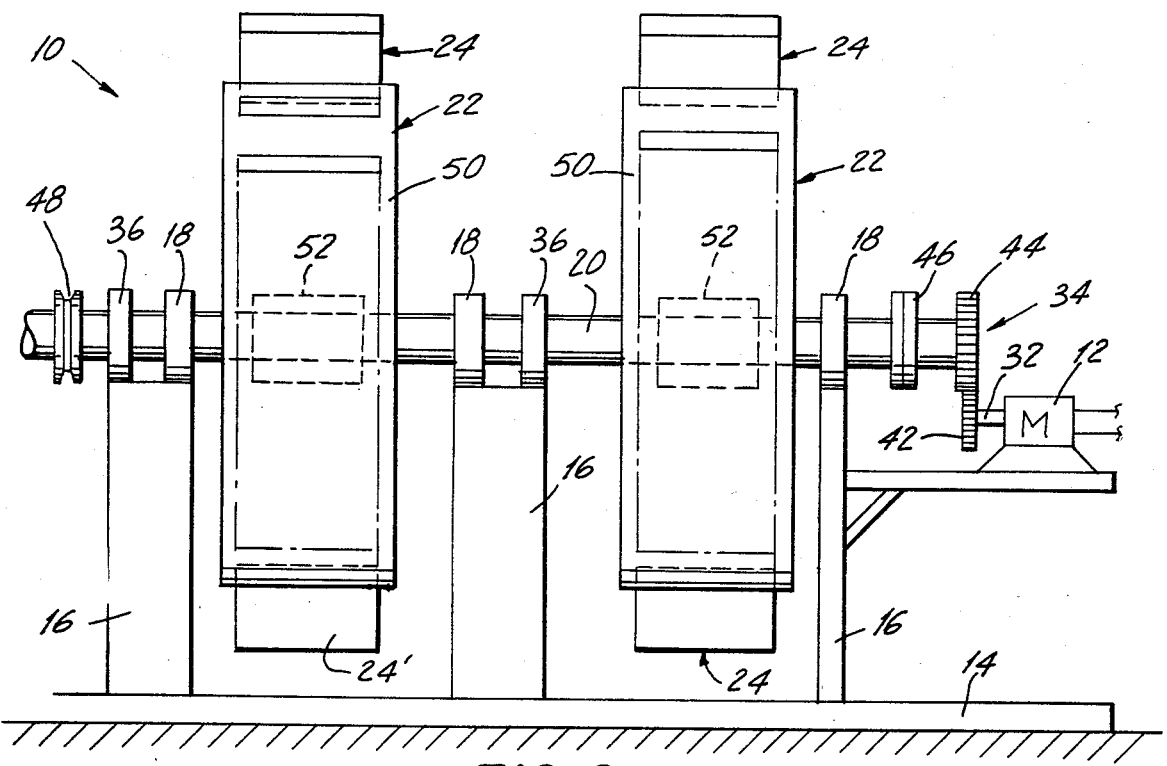
FIG. 2

GRAVITY PULL ROTOR

BACKGROUND OF THE INVENTION

The instant invention relates generally to machines that are operated in part by the force of gravity and more specifically it relates to a gravity operated rotor with an auxiliary motor whereby the rotor will turn by the force of gravity changing it's center of gravity.

The center of gravity of a body, or of a system of bodies rigidly connected together, is that point about which, if suspended, all the parts will be in equilibrium, that is, there will be no tendency to rotation. It is the point through which passes the resultant of the efforts of gravitation on each of the elementary particles of a body.

Therefore, a body suspended at it's center of gravity is in equilibrium in all positions. If suspended at a point outside of it's center of gravity, it will assume such a position that it's center of gravity will be vertically below it's point of suspension.

SUMMARY OF THE INVENTION

A principle object of the present invention is to provide a gravity operated rotor with an auxiliary motor whereby the force of gravity will change the center of gravity within the rotor to rotate a drive shaft connected to it.

Another object is to provide a gravity operated rotor with an auxiliary motor that has a plurality of radially extending curved chutes with slideable weights therein affixed around the circumference of the rotor to change the center of gravity within the rotor and keep the rotor rotation.

An additional object is to provide a gravity operated rotor with an auxiliary motor whereby when friction eventually slows down the rotation of the rotor the auxiliary motor will assist in rotating the rotor when needed.

A further object is to provide a gravity operated rotor with an auxiliary motor that is economical in cost to manufacture.

A still further object is to provide a gravity operated rotor with an auxiliary motor that is simple and easy to use.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic front view of the invention.

FIG. 2 is a diagrammatic side view thereof.

FIG. 3 is an enlarged detailed view of one of the chutes with parts broken away.

DETAILED DESCRIPTION OF THE PREFERRED EMBODIMENTS

Turning now descriptively to the drawings, in which similar reference characters denote similar elements throughout the several views, FIGS. 1 and 2 illustrates a gravity operated rotor 10 with an auxiliary motor 12 which contains a base member 14 that has vertical spaced mounts 16. Each mount 16 has a top bearing collar 18. A drive shaft 20 is rotatably placed through the bearing collars 18. Rotor drums 22 are concentrically affixed to the drive shaft 20 between the bearing collars 18.

A plurality of radially extending curved chutes 24 are affixed around circumference of each rotor drum 22. A weight 26 is slideably placed within each one of the chutes 24. The rotor drum 22 will rotate when the weights 26 within the chutes on one side 28 of the rotor drum slides down away from the drive shaft 20 making the one side 28 heavier. As the chutes 24 on the other side 30 of the rotor drum 22 ascends the weights 26 within the chutes will slide down towards the drive shaft 20 making the other side 30 lighter thus shifting center of gravity by the force of gravity on the weights 26 to keep the rotor drum 22 rotating.

The auxiliary motor 12 has a shaft 32 mechanically connected at 34 to the drive shaft 20 so that when friction eventually slows down the rotor drum 22 the auxiliary motor 12 will assist in rotating the drive shaft.

Brake drums 36 are affixed to top of the mounts 16 to engage the drive shaft 20 and stop rotation thereof. A governors 38 with their own mounts 40 are provided. The mounts 40 are affixed on the base member 14 so that the governors 38 will engage the rotor drum 22 to control speed of rotation of the rotor drum.

A set of gears 42, 44 are in mesh engagement with each other at 34. The first gear 42 is connected to end of the motor shaft 32 while the second gear 44 is connected to end of the grive shaft 20. A clutch 46 is mounted on the drive shaft 20 to disengage and engage the second gear 44 so that the motor 12 can be used when needed. A pulley 48 is mounted on the drive shaft 20 for a power take off (not shown) from rotation of the drive shaft.

Each rotor drum 22 further contains a flat circular rim 50 for holding the chutes 24. A hub 52 that has an upper portion of a keyway 54 is mounted on the drive shaft 20 that has a lower portion of the keyway 54. A plurality of spokes 56 extend radially between the rim 50 and the hub 52. A key 58 is positioned within the keyway 54 to hold the hub 52 to the drive shaft 20.

A gear ring 60 is mounted on the spokes 56 concentrically between the rim 50 and the hub 52. A drive pinion gear 62 is in adjustable mesh engagement with the gearing 60 to rotate the rotor drum 22 when servicing the rotor drum.

FIG. 3 shows one of the chutes 24 in greater detail. One of it's walls 64 has a loading aperture 66 therein. A plate 68 is removably mounted by fasteners 70 to the wall 64 to remove and replace the weight 26 therein. A gasket 72 seals the plate 68 to the wall 64. A plug 74 extends through the plate 68 so that liquid 76 can be placed into the chute 24. A drain spout 78 is placed through the lower portion of the chute so that the liquid 76 can be removed from the chute.

The weights 26 are fabricated out of solid heavy materials, such as steel, copper, brass, lead and the like and can be in the shape of a ball or rod. The weights 26 can be fluid such as water, oil, mercury and the like. When the weights 26 are solid heavy materials the fluid 76 will be lubricating oil to help in sliding the weights.

The rotor drums 22 can be used singly or in a series. When used in a series the chutes are off set from one rotor drum to the other when the rotor drums are affixed to the drive shaft 20. When the chutes 24 are installed they must be spaced evenly and closely around the rotor drums 22 and can be in various lengths depending on amount of power needed.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A gravity operated rotor with an auxiliary motor, which comprises:
    (a) a base member having a pair of vertical spaced mounts, each said mount having a top bearing collar;
    (b) a drive shaft rotatably placed through said bearing collars;
    (c) a rotor drum concentrically affixed to said drive shaft between said bearing collars;
    (d) a plurality of radially extending curved chutes affixed around circumference of said rotor drum;
    (e) a plurality of weights, each said weight is slidably placed within one of said chutes, whereby said rotor drum will rotate when said weights within said chutes on one side of said rotor drum slides down away from said drive shaft making said one side heavier and as said chutes on other side of said rotor drum ascends said weights within said chutes will slide down towards said drive shaft making said other side lighter thus shifting center of gravity by the force of gravity on said weights to keep said rotor drum rotating; and
    (f) said auxiliary motor having a shaft mechanically connected to said drive shaft so that when friction eventually slows down the rotor drum said auxiliary motor will assist in rotating said drive shaft.

2. A gravity operated rotor with an auxiliary motor as in claim 1 further comprising:
    (a) a brake drum affixed to top of one of said mounts to engage said drive shaft and stop rotation thereof; and
    (b) a governor with mount, said mount affixed on said base member so that said governor will engage said rotor drum to control speed of rotation of said rotor drum.

3. A gravity operated rotor with an auxiliary motor as in claim 2 further comprising:
    (a) a set of gears in mesh engagement with each other, said first gear connected to end of said motor shaft while said second gear connected to end of said drive shaft;
    (b) a clutch mounted on said drive shaft to disengage and engage said second gear so that said motor can be used when needed; and
    (c) a pulley mounted on said drive shaft for a power take off from rotation of said drive shaft.

4. A gravity operated rotor with an auxiliary motor as in claim 1 wherein said rotor drum further comprises:
    (a) a flat circular rim for holding said chutes;
    (b) a hub having an upper portion of a keyway mounted on said drive shaft having a lower portion of said keyway;
    (c) a plurality of spokes extending radially between said rim and said hub; and
    (d) a key positioned within said keyway to hold said hub to said drive shaft.

5. A gravity operated rotor with an auxiliary motor as in claim 4 wherein said rotor drum further comprises:
    (a) a gear ring mounted on said spokes concentrically between said rim and said hub; and
    (b) a drive pinion gear in adjustable mesh engagement with said gear ring to rotate said rotor drum when servicing said rotor drum.

6. A gravity operated rotor with an auxiliary motor as recited in claim 5, wherein each of said chutes further comprises:
    (a) a wall having a loading aperture therein; and
    (b) a plate removably mounted to said wall to remove and replace said weight therein.

7. A gravity operated rotor with an auxiliary motor as recited in claim 6, wherein each of said chutes further comprises:
    (a) a gasket to seal said plate to said wall;
    (b) a plug to extend through said plate so that liquid can be placed into said chute; and
    (c) a drain spout placed through said lower portion of said chute so that said liquid can be removed from said chute.

8. A gravity operated rotor with an auxiliary motor as recited in claim 7, wherein said weights are fabricated out of solid heavy materials.

9. A gravity operated rotor with an auxiliary motor as recited in claim 7, wherein said weights are fluid.

* * * * *